United States Patent
Wang et al.

(10) Patent No.: US 11,036,090 B2
(45) Date of Patent: Jun. 15, 2021

(54) ARRAY SUBSTRATE INCLUDING A TRANSPARENT CONDUCTIVE STRIP AND A WIRE AND MANUFACTURING METHOD THEREOF, AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Xiaoyuan Wang, Beijing (CN); Wu Wang, Beijing (CN); Rui Wang, Beijing (CN); Yajie Bai, Beijing (CN); Zhuo Xu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 157 days.

(21) Appl. No.: 15/258,161

(22) Filed: Sep. 7, 2016

(65) Prior Publication Data
US 2017/0200739 A1    Jul. 13, 2017

(30) Foreign Application Priority Data
Jan. 12, 2016  (CN) .......................... 201610017659.7

(51) Int. Cl.
*H01L 27/32*  (2006.01)
*G02F 1/1339*  (2006.01)
*G02F 1/1343*  (2006.01)

(52) U.S. Cl.
CPC .......... *G02F 1/1339* (2013.01); *G02F 1/1343* (2013.01); *H01L 27/32* (2013.01)

(58) Field of Classification Search
CPC ........................... H01L 27/32; H01L 27/3265
See application file for complete search history.

(56) References Cited

U.S. PATENT DOCUMENTS

2002/0153569 A1* 10/2002 Katayama ............. G02F 1/1368
257/351
2005/0202601 A1* 9/2005 Koide ................. H01L 27/1259
438/149

(Continued)

FOREIGN PATENT DOCUMENTS

| CN | 1917227 A | 2/2007 |
|---|---|---|
| CN | 103296033 A | 9/2013 |
| JP | 2008-177466 A | 7/2008 |

OTHER PUBLICATIONS

The First Chinese Office Action dated Mar. 23, 2018; Appl. No. 20161007659.7.

*Primary Examiner* — Lex H Malsawma
*Assistant Examiner* — Geoffrey H Ida

(57) ABSTRACT

Embodiments of the present disclosure provide an array substrate and a manufacturing method thereof, and a display device. The array substrate has a display region and a wiring region located on a periphery of the display region. The array substrate includes a base substrate, and a transparent conductive strip and a wire formed on the base substrate in the wiring region; the transparent conductive strip and the wire are located in different layers and are in direct contact with each other, and the wire has one or more exposure holes formed therein.

17 Claims, 4 Drawing Sheets

(56) References Cited

U.S. PATENT DOCUMENTS

| | | | |
|---|---|---|---|
| 2007/0024187 A1* | 2/2007 | Shin | H01L 51/5281 313/504 |
| 2015/0097172 A1* | 4/2015 | Han | H01L 27/3265 257/40 |
| 2015/0318305 A1 | 11/2015 | Zhang et al. | |

* cited by examiner

ARRAY SUBSTRATE INCLUDING A TRANSPARENT CONDUCTIVE STRIP AND A WIRE AND MANUFACTURING METHOD THEREOF, AND DISPLAY DEVICE

TECHNICAL FIELD

Embodiments of the present disclosure relate to an array substrate and a manufacturing method thereof, and a display device.

BACKGROUND

In an existing liquid crystal processing technology, liquid crystal is filled in a liquid crystal dropping manner. Because sealant may be in contact with liquid crystal before the sealant is cured, a UV curing manner is commonly adopted in the industry to prevent pollution caused to the liquid crystal when the liquid crystal is in direct contact with the sealant. The so-called UV curing (ultraviolet curing) is mainly to shield a liquid crystal region (which is also called a display region, namely an A/A region) with a shielding object (such as a mask), and expose a region coated with the sealant. So, a UV curing device is utilized to perform UV curing of the sealant.

SUMMARY

An embodiment of the present disclosure provides an array substrate, having a display region and a wiring region located on a periphery of the display region, wherein, the array substrate comprises a base substrate, and a transparent conductive strip and a wire formed on the base substrate in the wiring region; the transparent conductive strip and the wire are located in different layers and are in direct contact with each other, and the wire has one or more exposure holes formed therein.

Another embodiment of the present disclosure provides a method for manufacturing an array substrate, having a display region and a wiring region located on a periphery of the display region, the method including: forming a transparent conductive strip and a wire on a base substrate in the wiring region; wherein, the transparent conductive strip and the wire are located in different layers and are in direct contact with each other, and one or more exposure holes are formed of the wire.

Yet another embodiment of the present disclosure provides a display device, including the array substrate described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
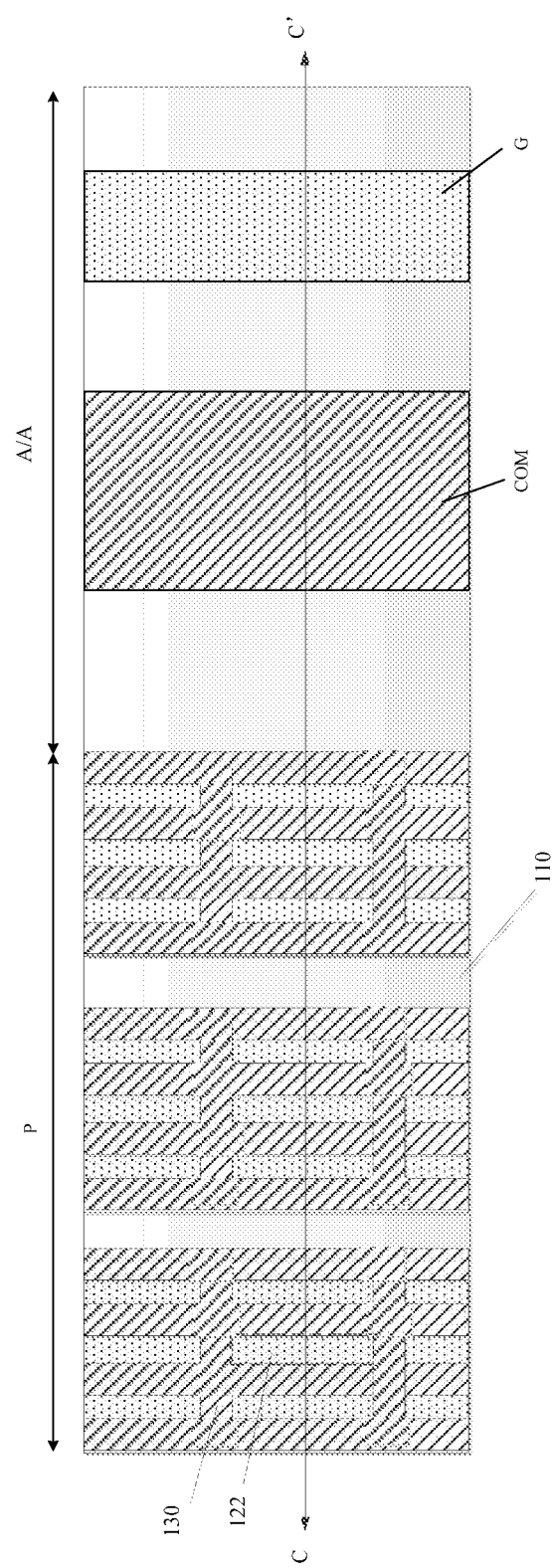
FIG. 1 is a partial top view schematic diagram of a wiring region and a display region an array substrate provided by an embodiment of the present disclosure.

In a related art, in order that ultraviolet light can penetrate an array substrate and irradiate on a sealant, a region of the array substrate corresponding to the sealant needs to be transparent or partially transparent. The region is commonly a wiring region of the array substrate, wherein a plurality of wires are arranged and used for connecting a thin film transistor (TFT) in the array substrate to a pressing connection region.

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. It is noted that the embodiments of the disclosure and characteristics in the embodiments can be combined without confliction. Based on the described embodiments herein, those skilled in the art can obtain other embodiment (s), without any inventive work, which should be within the scope of the present disclosure.

In a first aspect, the present disclosure provides an array substrate, the array substrate including:

a base substrate, a transparent conductive layer pattern formed on the base substrate, and a wire layer pattern formed on the transparent conductive layer pattern and adjacently connected with the transparent conductive layer pattern;

The wire layer pattern includes a plurality of wires, a transparent conductive layer includes a plurality of independent conductive strips, and each conductive strip corresponds to one wire; a plurality of exposure holes are opened in each wire; each conductive strip includes a first portion opposite to a position of a corresponding wire, and second portions opposite to positions of respective exposure holes opened in the wire, and each second portion is connected with the first portion.

In a second aspect, the present disclosure provides a method for manufacturing an array substrate, the method including:

forming a transparent conductive layer pattern on a substrate and forming a wire layer pattern located on the transparent conductive layer pattern and adjacently connected with the transparent conductive layer pattern;

wherein, the wire layer pattern includes a plurality of wires; a plurality of exposure holes are opened in each wire, and a transparent conductive layer includes a plurality of independent conductive strips; each conductive strip corresponds to one wire and includes a first portion opposite to a position of the wire and second portions opposite to positions of respective exposure holes opened in the wire, and each second portion is connected to the first portion.

In the array substrate provided by embodiments of the present disclosure and the array substrate manufactured by adopting the method for manufacturing array substrate provided by the present disclosure, the transparent conductive layer pattern arranged on the substrate includes a first portion opposite to the wire and second portions opposite to positions of respective exposure holes, and the wire and the second portions are connected through the first portion. It is equivalent to that the first portion and the second portions are both connected to the corresponding wire in parallel, resistance of the corresponding wire can be reduced, and conductivity of the corresponding wire can be improved.

In implementation, structures of the array substrate described above may be in different forms according to particular application scenes, and corresponding manufacturing methods are not totally the same, which is exemplified in the following.

Figure 2:
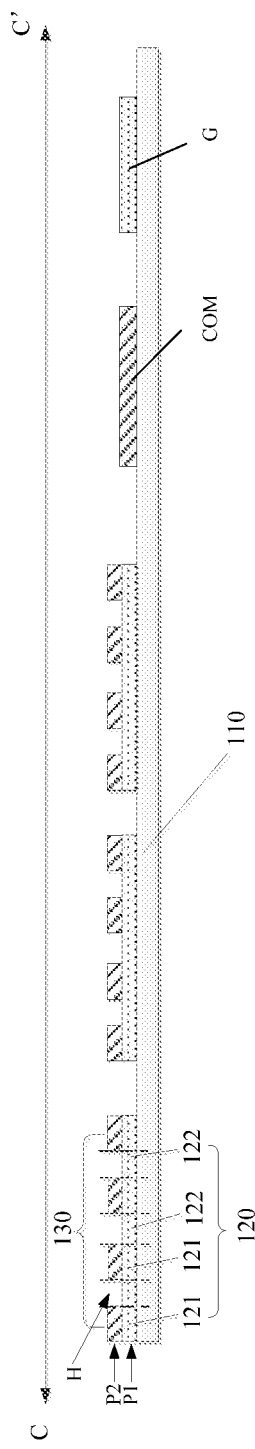
FIG. 2 is a partial longitudinal sectional view schematic diagram of the wiring region and the display region of the array substrate provided by the embodiment of the present disclosure.

FIG. 1 is a partial top view of an array substrate provided by an embodiment of the present disclosure, and FIG. 2 is a longitudinal section schematic diagram of the array substrate in FIG. 1 at a position of C-C' in FIG. 1; referring to FIG. 1 and FIG. 2, the array substrate includes a base substrate 110, a transparent conductive layer pattern P1 formed on the base substrate 110, and a wire layer pattern P2 formed on an upper surface of the transparent conductive layer pattern;

The wire layer pattern P2 includes a plurality of wires 130; correspondingly, the transparent conductive layer pattern P1 also includes a plurality of independent transparent conductive strips 120, and each transparent conductive strip 120 corresponds to one wire 130; a plurality of exposure holes H are opened in each wire 130, and the exposure holes H can be used for performing exposure and curing to a sealant. Each exposure hole H penetrates the wire 130. Each conductive strip 120 includes a first portion 121 opposite to a position of the corresponding wire 130 in a thickness direction of the base substrate 110 (namely, a direction perpendicular to an upper surface of the base substrate 110), and a plurality of second portions 122 respectively opposite to positions of the plurality of exposure holes opened in the wire 130 in a thickness direction of the base substrate 110. In the embodiment, the first portion 121 and the respective second portions 122 corresponding to the same wire 130 form a whole conductive block, to completely cover a region below the corresponding wire 130 and regions below the respective exposure holes in the wire 130; that is to say, the first portion 121 is directly connected with the corresponding wire 130, and the respective second portions 122 are connected with the corresponding wire 130 through the first portion 121. In this way, resistance of the corresponding wire 130 can be reduced through not only the first portion 121 of each conductive strip 120 but also the second portions 122. Thus, conductivity of the corresponding wire 130 can be improved. Because the second portions 122 located directly below the exposure holes are transparent, transmittance of ultraviolet light will not be affected, and a UV curing process will not be affected.

It can be understood that, the present disclosure does not limit the number of the exposure holes H in the same wire. In another embodiment, only one exposure hole H is formed in one wire 130.

In the embodiment of the present disclosure, the first portion 121 and the respective second portions 122 are connected as a whole conductive block, and thus, an area of the transparent conductive strip connected with the corresponding wire in parallel can be as large as possible, to reduce the resistance of the wire as much as possible, and this kind of setting is easy to manufacture. Of course, in implementation, the first portion 121 and the second portions 122 are not necessarily connected as one whole conductive block to completely cover the corresponding region, any corresponding technical solutions through which the second portions 122 can be connected to the corresponding wire through the first portion 121 should also be within the protection scope of the present disclosure.

It can be understood that, although in the embodiments described above, the transparent conductive layer pattern P1 is located between the wire layer pattern P2 and the base substrate 110, the present disclosure is not limited thereto. In another embodiment, the wire layer pattern P2 can be located between the transparent conductive layer pattern P1 and the substrate 110. In such a case, a portion of the transparent conductive strip 120 opposite to the exposure holes H in the corresponding wire 130 can fully fill the exposure holes H. In this way, a lower surface of the transparent conductive strip 120 is in direct contact with an upper surface of the corresponding wire 130, a portion of the transparent conductive strip 120 extending into the exposure holes H of the corresponding wire 130 is also in direct contact with a side surface of the wire 130 at positions of the exposure holes H. In the same way, the array substrate of such configuration can, in one aspect, improve the conductivity of the corresponding wire 130, and in the other aspect, can facilitate a subsequent sealant UV curing process.

In implementation, the transparent conductive layer pattern can also include a first electrode pattern formed on a base substrate in the display region. The first electrode pattern and the plurality of transparent conductive strips 120 are located in a same layer and made of a same material. For example, the first electrode pattern can be a common electrode pattern or a pixel electrode pattern. The arrangement has advantages that in a process forming the common electrode pattern or the pixel electrode pattern, the transparent conductive strips are formed in the wiring region at the same time, and manufacturing difficulty can be reduced easily. In implementation, the wire layer pattern can further include a gate electrode pattern formed on the substrate in the display region, the gate electrode pattern and the plurality of wires 130 are located in a same layer and made of a same material. Of course, it is not necessary to implement in this manner.

The transparent conductive layer pattern referred to in the embodiments of the present disclosure can be made from ITO and other materials.

For example, in the array substrate as shown in FIG. 2, other structures such as a gate insulating layer, a passivation layer and the like can also be formed above the wires 130, the transparent conductive layer pattern and the substrate 110, and in order to facilitate description, the corresponding structures are not shown in FIG. 2.

Figure 3:
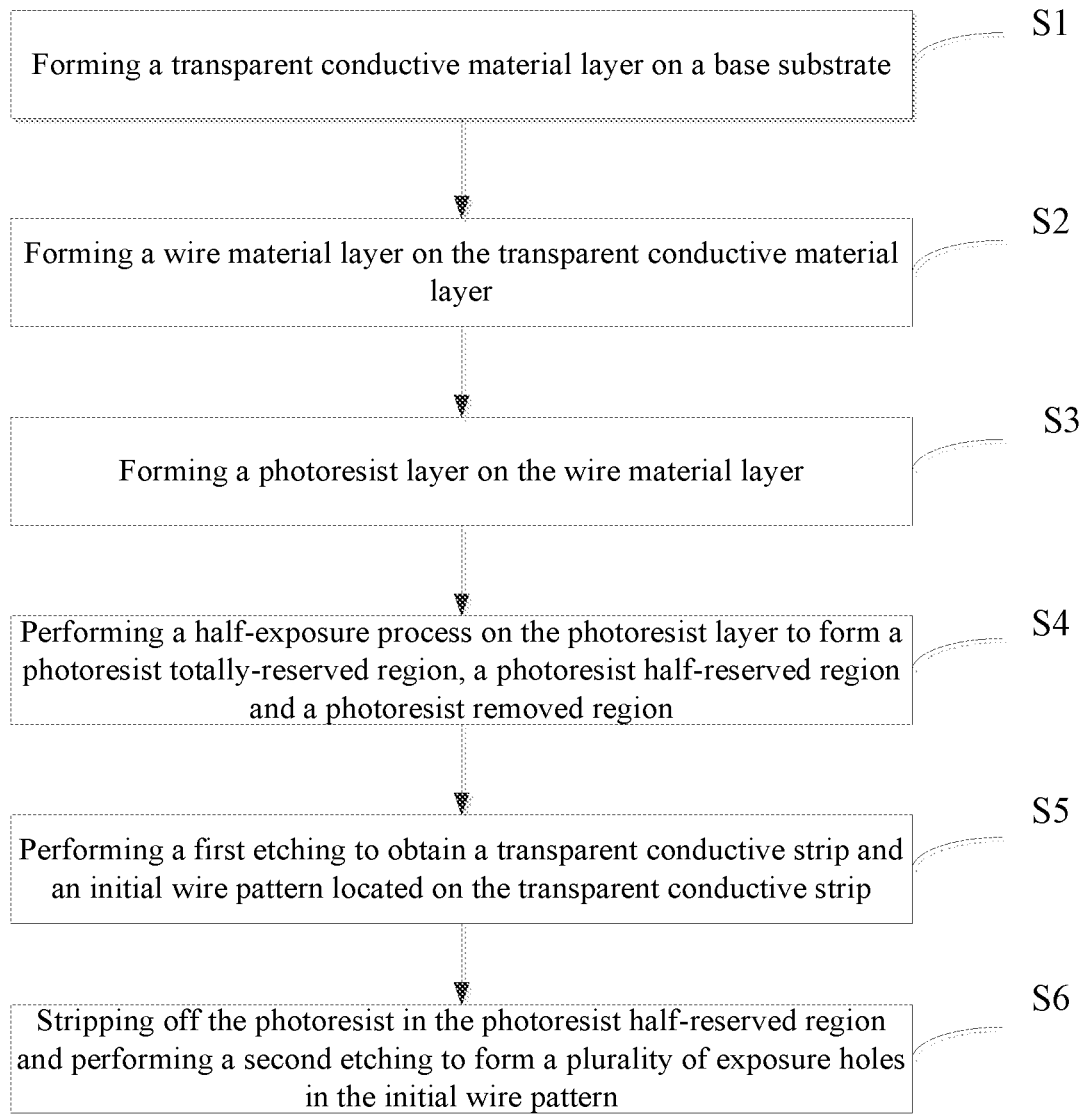
FIG. 3 is a flow diagram of a method for manufacturing an array substrate provided by an embodiment of the present disclosure.

When used for manufacturing the array substrate shown in FIG. 1 and FIG. 2, the method for manufacturing the array substrate provided by the second aspect of the present disclosure, as shown in FIG. 3, for example, includes steps of:

Step S1: forming a transparent conductive material layer on a base substrate.

For example, a layer of ITO can be deposited on the base substrate by a magnetron sputtering technology to serve as the transparent conductive material layer. The step S1 can be implemented in many manners in related art, which will not be described repeatedly in the embodiment of the present disclosure.

Figure 4:
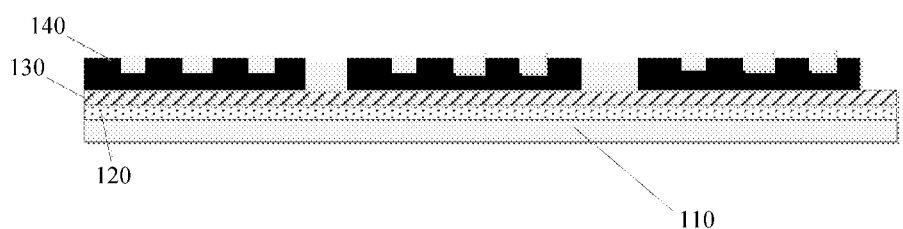
FIG. 4 and FIG. 5 are schematic diagrams of an intermediate structure formed during manufacturing an array substrate according to the method in FIG. 3.
Figure 5:
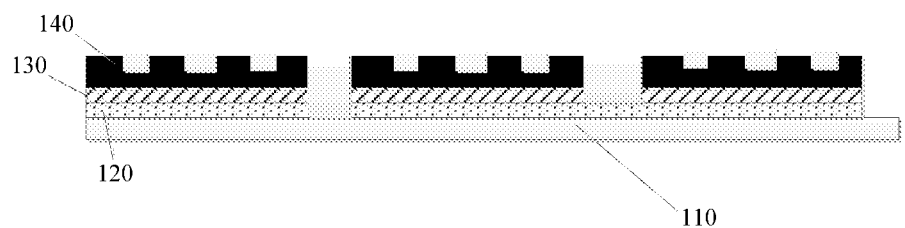

Step S2: forming a wire material layer on the transparent conductive material layer;

Step S3: forming a photoresist layer on the wire material layer;

Step S4: carrying out a half-exposure process on the photoresist layer to form a photoresist totally-reserved region, a photoresist half-reserved region and a photoresist removed region; a structure obtained after the step S4, with reference to FIG. 4, includes the base substrate 110, a transparent conductive material layer 120 formed on the substrate 110 (in order to facilitate illustration, the transparent conductive material layer is also indicated as 120), a wire material layer 130 (in order to facilitate illustration, the wire material layer is also indicated as 130) formed on the transparent conductive material layer 120, and a photoresist layer 140 formed on the wire material layer 130. The photoresist layer 140 has different thicknesses in different regions. The photoresist layer 140 has a largest thickness in the photoresist totally-reserved region and a smaller thickness in the photoresist half-reserved region. In the photoresist removed region, the photoresist layer 140 is totally removed. The photoresist totally-removed region is a region the transparent conductive layer pattern will not formed therein; the photoresist half-reserved region corresponds to respective exposure holes and is used for forming the exposure holes in respective wires; the photoresist totally-reserved region corresponds to respective wires (not including the exposure holes) and is used for guaranteeing that wire material on peripheries of the exposure holes is not etched during etching to forming the exposure holes;

Step S5: performing a first etching to obtain the transparent conductive layer pattern and an initial wire layer pattern on the transparent conductive layer pattern; FIG. 5 shows a structure obtained after the step S5 at a position of the wiring region, in which a shape of the initial wire layer pattern is consistent with that of the transparent conductive layer pattern at this stage, and the exposure holes have not yet formed in the wire.

For example, the first etching can be a dry etching by adopting appropriate etching gas, and the transparent conductive material layer and the wire layer material can be etched at the same time.

Step S6: stripping off the photoresist in the photoresist half-reserved region to perform a second etching to form the plurality of exposure holes in the initial wire layer pattern. After the step S6, the method described above may further includes a step of stripping off the photoresist in the totally-reserved region. FIG. 1 and FIG. 2 show a resulting structure in the wiring region, which will not be illustrated in detail herein.

After the step S6, the method may also include a process of manufacturing a gate insulating layer, an active layer, a source and drain electrode layer, an etch blocking layer and a pixel electrode layer. A specific process can refer to related art, which will not be illustrated by the present disclosure in detail herein.

For example, the second etching can be wet etching adopting a proper etching liquid (which is only effective for the wire material layer), so that when the initial wire is etched to form the exposure holes, the transparent conductive layer pattern is not etched.

As for the steps S5 and S6 described above, the initial wire layer pattern and the transparent conductive layer pattern formed in the step S5 can also include an initial gate electrode pattern and an electrode pattern such as common electrode pattern located in the display region respectively, for example. In the step S6, the initial gate electrode pattern can also be etched to form a final gate electrode pattern. In this way, in the steps of manufacturing the gate electrode pattern and the common electrode pattern, manufacturing of the conductive strips and the wires located in the wiring region is completed at the same time, which reduces the number of patterning processes, and lowers manufacturing difficulty.

As another aspect of the present disclosure, the present disclosure further provides a display device, the device comprising any array substrate described above.

In implementation, the display device can be an electronic paper, a mobile phone, a tablet personal computer, a TV set, a display, a laptop, a digital photo frame, a navigator or any product or part with a display function.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The present application claims priority of Chinese Patent Application No. 201610017659.7 filed on Jan. 12, 2016, the present disclosure of which is incorporated herein by reference in its entirety as part of the present application.

The invention claimed is:

1. An array substrate, having a display region and a wiring region located on a periphery of the display region, wherein, the array substrate comprises a base substrate, and a transparent conductive strip and a wire formed on the base substrate in the wiring region; the transparent conductive strip and the wire are located in different layers and are in direct contact with each other, and the wire has one or more exposure holes formed therein and configured to perform exposure and curing to a sealant, in a plan view of the array substrate, at least one of the one or more exposure holes has a closed shape, the wire is directly formed on the transparent conductive strip, and each of the exposure holes penetrates the wire to exposure an upper surface of the transparent conductive strip, the array substrate further comprises a gate electrode pattern formed on the substrate in the display region, and the gate electrode pattern and the wire are located in a same layer and made of a same material by a same process.

2. The array substrate according to claim 1, wherein, the transparent conductive strip is located between the base substrate and the wire, the transparent conductive strip includes a first portion opposite to the wire in a thickness direction of the substrate and one or more second portions opposite to the one or more exposure holes of the wire in one to one correspondence in the thickness direction of the substrate, and the second portions are electrically connected to the wire.

3. The array substrate according to claim 2, wherein, a vertical projection of the first portion of the transparent conduction strip on the base substrate coincides with that of the wire on the base substrate, and vertical projections of the one or more second portions of the transparent conductive strip on the substrate coincide with those of the one or more exposure holes of the wire on the substrate.

4. The array substrate according to claim 1, further comprising a first electrode pattern formed on the substrate in the display region, the first electrode pattern and the transparent conductive strip being located in a same layer and made of a same material.

5. The array substrate according to claim 4, wherein, the first electrode pattern is a common electrode pattern.

6. A method for manufacturing an array substrate, having a display region and a wiring region located on a periphery of the display region, the method comprising:

forming a transparent conductive strip and a wire on a base substrate in the wiring region;

wherein, the array substrate comprises the base substrate, and the transparent conductive strip and the wired formed on the base substrate in the wiring region; the transparent conductive strip and the wire are located in different layers and are in direct contact with each other, and one or more exposure holes are formed of the wire and are configured to perform exposure and curing to a sealant, in a plan view of the array substrate, at least one of the one or more exposure holes has a closed shape, the wire is directly formed on the transparent conductive strip, and each of the exposure holes penetrates the wire to exposure an upper surface of the transparent conductive strip, the method further comprises forming a gate electrode pattern on the base substrate in the display region, and the gate electrode pattern and the wire being located in a same layer and made of a same material by a same process.

7. The method according to claim 6, wherein, the transparent conductive strip is located between the base substrate and the wire, the transparent conductive strip includes a first portion opposite to the wire in a thickness direction of the substrate and one or more second portions opposite to the one or more exposure holes of the wire in one to one correspondence in a thickness direction of the substrate, and the second portions are electrically connected to the wire.

8. The method according to claim 7, wherein, a vertical projection of the first portion of the transparent conduction strip on the base substrate coincides with that of the wire on base the substrate, and vertical projections of the one or more second portions of the transparent conductive strip on the base substrate coincide with those of the one or more exposure holes of the wire on the base substrate.

9. The method according to claim 6, further comprising forming a first electrode pattern on the base substrate in the display region, the first electrode pattern and the transparent conductive strip being located in a same layer and made of a same material.

10. The method according to claim 6, wherein, the first electrode pattern is a common electrode pattern.

11. The method according to claim 6, wherein, the forming a transparent conductive strip and a wire on the base substrate in the wiring region, includes:
    forming a transparent conductive material layer on the substrate;
    forming a wire material layer on the transparent conductive material layer;
    forming a photoresist layer on the wire material layer;
    carrying out a half-exposure process on the photoresist layer to form a photoresist totally-reserved region, a photoresist half-reserved region and a photoresist removed region;
    performing a first etching to obtain the transparent conductive strip and an initial wire located on the transparent conductive strip;
    stripping off photoresist in the photoresist half-reserved region and performing a second etching to form the one or more exposure holes in the initial wire, so as to form the wire,
    wherein, in a plan view of the array substrate, at least one of the one or more exposure holes has a closed shape.

12. A display device, comprising the array substrate according to claim 1.

13. The array substrate according to claim 2, further comprising a first electrode pattern formed on the substrate in the display region, the first electrode pattern and the transparent conductive strip being located in a same layer and made of a same material.

14. The array substrate according to claim 13, wherein, the first electrode pattern is the common electrode pattern.

15. The array substrate according to claim 3, further comprising a first electrode pattern formed on the substrate in the display region, the first electrode pattern and the transparent conductive strip being located in a same layer and made of a same material.

16. The array substrate according to claim 15, wherein, the first electrode pattern is a common electrode pattern.

17. The array substrate according to claim 1, wherein the wire only has one flat bottom surface, and a bottom surface of the wire entirely contacts with a top surface of the transparent conductive strip.

* * * * *